June 14, 1960   A. J. CHERRY   2,940,205
FISHING LURE
Filed July 14, 1955
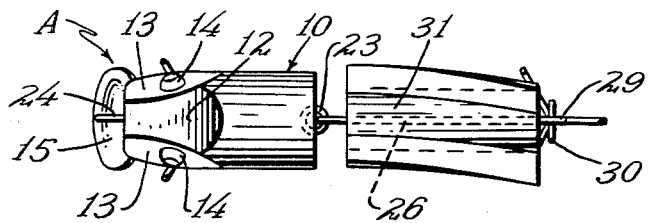
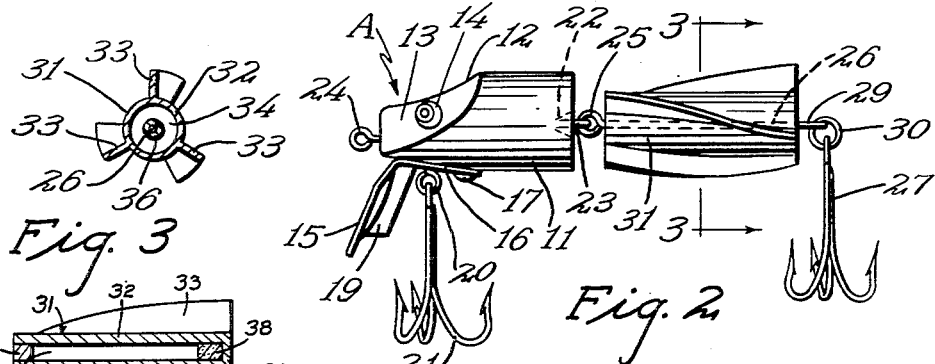
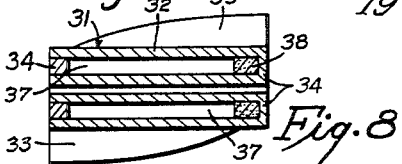
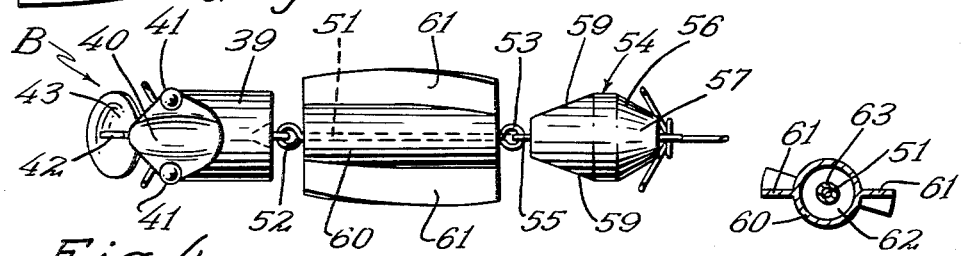
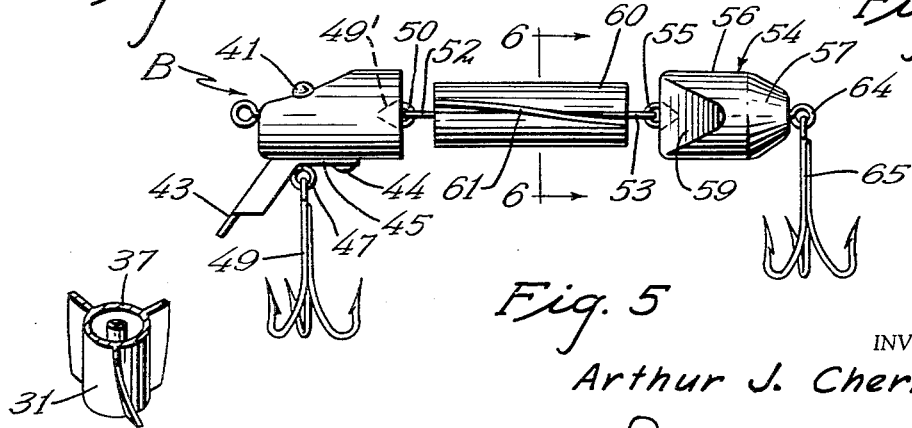
INVENTOR
Arthur J. Cherry
BY Robert M. Dunning
ATTORNEY

United States Patent Office 2,940,205
Patented June 14, 1960

2,940,205

FISHING LURE

Arthur J. Cherry, 550 Orleans St., St. Paul 7, Minn.

Filed July 14, 1955, Ser. No. 521,997

7 Claims. (Cl. 43—42.16)

This invention relates to an improvement in fishing lures and deals particularly with a plug suitable as a lure for catching fish.

Various types of fishing plugs have been produced, designed to attract the fish. Certain such plugs have been produced which rotate about a longitudinal axis, or which includes rotatable parts. However, most such structures do not have certain advantages from a standpoint of attracting fish. An object of the present invention resides in the provision of a lure which has been particularly advantageous from this standpoint.

A feature of the present invention resides in the provision of a lure having a rotatable section designed to rotate about a longitudinal axis. This rotatable member is hollow and cylindrical in form, having closed ends. The outer surface of the cylindrical body is provided with a plurality of guide vanes which extend the full length of the body portion. These vanes extend spirally about the body. As a result, as the plug is drawn through the water, the body slowly rotates about its longitudinal axis.

A feature of the present invention resides in the use of vanes which extend the full length of the rotatable portion of the body. In the past it has been more common practice to provide relatively short vanes which are secured to the rotatable body near one end thereof. By extending the vanes the full length of the body, a better action is provided, and the tendency for the rotatable portion of the body to move in a predetermined path is increased.

A further feature of the invention resides in applying different colors to the rotatable portion, each section of different color being defined by the vanes. As the vanes extend the full length of the body, the vanes divide the surface of the rotatable member into natural sections. By applying a different color in each of the sections, the appearance of the body changes as the body rotates, providing an unusual effect as the lure moves through the water.

A further feature of the present invention resides in the provision of a lure having a forward section to which the rotatable section is articulated, and in properly proportioning the sections to produce the best result. The forward section of the body is of larger diameter than the rotatable section at the base of the vanes. The vanes project beyond the diameter of the forward section. This arrangement appears to be of material advantage in the action of the lure while travelling through the water.

An added feature of the present invention resides in the provision of a lure having a rotatable section which is preferably constructed of plastic or similar material and which includes a hollow chamber therein. This rotatable section may be produced in two sections, which are sealed in end abutting relation in the assembly of the lure.

Before assembly, the weight of the lure may be varied so that the lure is either lighter or heavier than the water it displaces. This may be accomplished by filling one or both ends of the lure to a desired extent with a material which hardens and increases the weight. By adding weight at one end only, the action of the lure may be substantially changed.

A feature of the present invention resides in the provision of a lure which may, if desired, be made in three sections one of which rotates. Accordingly, the rotatable section may be supported for axial rotation between a pair of other sections which wobble when pulled forwardly, or which change direction individually as the lure is moved. The rotation of the center section thus has a tendency to affect the operation of the rear section as the lure is moved through the water.

These and other objects and novel features of the present invention will be more clearly and fully set forth in the following specification and claims.

In the drawings forming a part of the specification:

Figure 1 is a top plan view of a fishing lure, showing the construction thereof.

Figure 2 is a side elevational view of the lure illustrated in Figure 1.

Figure 3 is a sectional view through the rotatable section of the lure, the position of the section being indicated by the line 3—3 of Figure 2 and the rear hook not being illustrated.

Figure 4 is a plan view of a modified form of lure construction.

Figure 5 is a side elevational view of the lure shown in Figure 4.

Figure 6 is a sectional view through the rotatable portion of the lure shown in Figures 4 and 5, the position of the section being indicated by the line 6—6 of Figure 5, and the rear section being eliminated.

Figure 7 is a perspective view of one end of the rotatable member shown in the drawings, two such sections being used to form the finished structure.

Figure 8 is a longitudinal section through the rotatable portion of the lure shown in Figures 1, 2 and 3.

The lure A is constructed as is best illustrated in Figures 1 to 3 of the drawings. The lure A includes a front section 10 comprising a generally cylindrical body 11 provided with a forwardly and downwardly tapered forward end portion 12. Flattened areas 13 are provided on either side of the tapered forward end 12, and means simulating eyes are attached to the flattened areas 13, as indicated by the numeral 14.

A concave disc 15 is supported beneath the forward end of the section 10 and includes a mounting plate 16 which is attached to the undersurface of the lure body near the forward end by screws such as 17 or by other suitable means. One or more gusset plates such as 19 connect the disc 15 with the plate 16 to reinforce the disc.

An eye 20 extends through the plate 16 and acts to support a hook 21, which is preferably of the treble type. A generally conical recess 22 is provided at the center of the body 10, at the rear end thereof, to accommodate a screw eye 23 partially projecting from the recess. A screw eye 24 is also provided at the forward end of the section 10 to accommodate a line or leader.

An eye 25 is linked into the eye 23 and is provided with an elongated pivot shank 26. This shank 26 is provided at its rear end with an eye or some sort of loop by means of which a rear treble hook 27 may be supported. The eye or loop at the rear of the shank 26 is indicated at 29, and the hook 27 is usually supported by a connecting link 30.

The shank 26 supports a rotatable member 31 which forms the most important part of the present invention. This rotatable member 31 may be formed in various ways, but in preferred arrangement the rotatable member comprises an elongated hollow tubular body 32 having angularly spaced ribs or vanes 33 mounted thereon and projecting in a generally radial direction therefrom. The ribs 33 are designed to extend in a spiral direction from the tubular body, although the degree of angularity between the front and rear ends of the vanes usually do not exceed about thirty degrees in a lure of common size. The number of vanes may be varied, but two or three such vanes operate very effectively, and an additional number of vanes is not believed essential.

The lure includes closed ends 34 and preferably include a central tubular member 36 extending between the closed ends. This tubular member 36 is designed to accommodate the elongated shank 26 which rotatably supports the body. The reason for this arrangement is to provide a liquid type body so that the body may contain a predetermined amount of air.

As is indicated in Figure 7 of the drawings, the body of the rotatable member 31 may be formed in two similar halves which are separately molded and which are then united by adhering the two sections in end abutting relation. A solvent or adhesive is applied to the end of at least one of the sections, and the two sections are held in end abutting relation until this material dries or evaporates. When completed the lure has a hollow chamber 37 therein.

Some plugs are made to float on the surface of the water when they are not being moved, and others are designed to sink to the bottom when not moved. The present structure may be varied to either float or sink. This is accomplished by proportioning the body so that the air chamber is just sufficient to cause the plug to float. By weighting the body, preferably before the sections of the rotatable member are adhered together, the lure may be made to have a specific gravity greater than that of water. This is accomplished by pouring a small amount of cement 38 or similar material into the sections before they are adhered together to produce the added weight. If weight is added to one end only of the rotatable section, the action of the lure in travelling through the water may be materially changed. In other words, if the rear end of the rotatable member is increased in weight, this end tends to sink faster than the opposite end, causing an unusual movement as the lure is moved. Quite a different movement is produced if the front end of the rotatable member is weighted.

In Figures 4 through 6 of the drawings, a slightly different form of construction is illustrated, and the lure shown in these figures is indicated in general by the letter B. In this form of construction the lure includes a forward portion 39 which may be identical with the forward section 10 of the lure A, or which may include a concave or inwardly curved forward and upper surface 40. Eyes 41 are provided on opposite sides of this inwardly dished forward end 40, and the end is shaped to tend to draw the lure downwardly to some extent as well as to create a wobbling action. The lure is drawn through the water by engagement of a line or leader with an eye in the nose of the forward section 39.

A concave disc 43, similar to the disc 15, is mounted on the under surface of the forward section 39 by suitable means such as screws 44, which extend through the anchor plate 45 attached to the disc 43. A screw eye 47 extends through the plate 45 and acts to support a hook structure 49.

The rear end of the lure body is provided with an axial conical recess 49' which accommodates a screw eye 50. An elongated shank 51 is provided with a loop end 52 engaged in the screw eye 50. The shank 51 is also provided with a looped rear end 53 to which the rear section 54 is attached. A screw eye 55 in the forward end of the rear section 54 is looped into the loop 53 to form a hinged connection between the sections.

The rear section 54 comprises a generally cylindrical body 56 having a tapered or conical rear end 57. The forward end of the rear section is preferably notched on opposite sides as indicated at 59, these notches being provided on opposite sides of the end section and tending to cause the rear section to wobble as it moves through the water. If preferred, the forward end of the rear section may be tapered in a conical manner.

The shank 51 supports a rotatable member 60 which may be identical with the rotatable member 31, or which may be provided with a different number of projecting vanes 61, the vanes extending radially from the body as viewed in section, and the vanes are spirally mounted so that longitudinal movement of the section will cause the same to rotate slowly.

As indicated in Figure 6, the rotatable body 60 is preferably provided with closed ends 62 and with a central tube 63 extending between the ends through which the shank 51 may extend. This body may be formed by the method previously described, if it is so desired.

The rear end section 54 is provided with a screw eye 64 at its rear end to which is attached a hook structure 65. As in the lure A the shank attached to the front section does not rotate, and as a result the rear hook does not rotate. The front and rear sections usually wobble as they move through the water, while the center section rotates about its longitudinal axis.

It will be seen that in both of the structures described the vanes on the rotatable member divide this member into natural sections throughout its length. These sections are preferably colored with different colors. For example, the sections may be colored black, red and white, or yellow, red and silver, or some other such combination of colors. As the rotatable section rotates, these sections are alternately seen from one side of the lure. However, because of the spiral nature of the vanes, one end of each color segment is seen before the other. Furthermore, as the vanes project from the body the change is quite rapid once it starts, due to the fact that the body of the vane hides the portion of the body behind it.

In some instances, the sections of the cylindrical body are painted in different colors with the vanes in contrasting colors. In other instances, the sections of the body and the adjoining vane surfaces are the same color. In still other cases, the body may be of one color and the different sides of the vanes may be in different colors. In any event rotation of the rotatable body causes a continual change in the appearance of the lure, thereby attracting the attention of the fish.

In accordance with the patent statutes, I have described the principles of construction and operation of my fishing lure, and while I have attempted to describe the best embodiments of the invention, I desire to have it understood that obvious changes may be made within the scope of the following claims without departing from my invention.

I claim:

1. A fishing lure including a rotatable section, a non-rotatable section hingedly connected to said rotatable section, said rotatable section comprising a hollow tubular body having closed ends, spirally radial extending vanes on said body projecting outwardly therefrom, an axial tubular member extending from end to end of said body, means extending through said tubular member rotatably supporting said tubular body, and weight means disposed in said hollow body for shifting the center of gravity thereof towards one end.

2. The construction described in claim 1 and in which the said axial tubular member and said hollow tubular body include two sections secured together in end abutting relation.

3. A fishing lure including generally cylindrical first and second non-rotatable sections, a shaft member hingedly connected at each end to said first and second sections to thereby retain said sections in a spaced relationship, and a generally cylindrical third section rotatably supported on said shaft member having a plurality of outwardly directed vanes, said vanes extending throughout the length of said third section.

4. A fishing lure including a first non-rotatable section, a rotatable section comprising a hollow tubular body having closed ends, spirally radial extending vanes on said body projecting outwardly therefrom and an axial tubular member extending centrally from end to end of said body, elongated means extending completely through said tubular member for rotatably supporting said tubular body, said elongated means being hingedly connected at one end to said first non-rotatable section, and a second non-rotatable section hingedly connected to the other end of said elongated means.

5. The construction described in claim 4 in which said second non-rotatable section is generally cylindrical near its hinged end but is formed with notches on opposite sides thereof diverging outwardly and away from its hinged end.

6. The construction described in claim 5 in which the end of said second non-rotatable section opposite its hinged end is conical.

7. The construction described in claim 6 including weight means disposed in said hollow body for shifting the center of gravity thereof towards one end.

References Cited in the file of this patent

UNITED STATES PATENTS

| | | |
|---|---|---|
| D. 162,741 | Lawhon | Apr. 3, 1951 |
| 644,911 | Hedgeland | Mar. 6, 1900 |
| 1,068,908 | Lane | July 29, 1913 |
| 1,427,147 | Barsch | Aug. 29, 1922 |
| 2,078,816 | Shenitz | Apr. 27, 1937 |
| 2,481,789 | Smith | Sept. 13, 1949 |
| 2,507,098 | Fischler | May 9, 1950 |
| 2,545,398 | Warobiew | Mar. 13, 1951 |
| 2,569,057 | Hinerman | Sept. 25, 1951 |
| 2,571,980 | Weigandt | Oct. 16, 1951 |
| 2,612,717 | Kuehnel | Oct. 7, 1952 |
| 2,662,330 | Ogburn | Dec. 15, 1953 |